(12) United States Patent
Sugie et al.

(10) Patent No.: US 11,680,145 B2
(45) Date of Patent: Jun. 20, 2023

(54) CROSSLINKED POLYOLEFIN FOAM AND MOLDED BODY USING SAME

(71) Applicant: SEKISUI CHEMICAL CO., LTD., Osaka (JP)

(72) Inventors: Yukihiro Sugie, Aichi (JP); Takumei Uno, Kariya (JP); Hiroki Mikami, Koga (JP); Hajime Takasugi, Hasuda (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 448 days.

(21) Appl. No.: 16/498,643

(22) PCT Filed: Mar. 30, 2018

(86) PCT No.: PCT/JP2018/013964
§ 371 (c)(1),
(2) Date: Sep. 27, 2019

(87) PCT Pub. No.: WO2018/182010
PCT Pub. Date: Oct. 4, 2018

(65) Prior Publication Data
US 2021/0284815 A1    Sep. 16, 2021

(30) Foreign Application Priority Data
Mar. 31, 2017 (JP) .............. JP2017-072812

(51) Int. Cl.
| C08J 9/10 | (2006.01) |
| C08L 23/12 | (2006.01) |
| C08J 9/00 | (2006.01) |
| C08L 23/08 | (2006.01) |

(52) U.S. Cl.
CPC ............ *C08J 9/0061* (2013.01); *C08J 9/103* (2013.01); *C08L 23/0815* (2013.01); *C08L 23/12* (2013.01); *C08J 2201/026* (2013.01); *C08J 2323/16* (2013.01); *C08J 2423/16* (2013.01); *C08L 2203/14* (2013.01); *C08L 2312/02* (2013.01)

(58) Field of Classification Search
CPC .... C08J 9/0061; C08J 9/103; C08J 2201/026; C08J 2323/16; C08J 2423/16; C08J 2323/12; C08J 2423/12; C08L 23/0815; C08L 23/12; C08L 2203/14; C08L 2312/02; B32B 5/18; B32B 27/32
See application file for complete search history.

(56) References Cited

U.S. PATENT DOCUMENTS

| 4,738,810 A | 4/1988 | Cheng-Shiang |
| 6,541,105 B1 | 4/2003 | Park |
| 2007/0082962 A1 | 4/2007 | Kusakawa et al. |
| 2011/0129656 A1 | 6/2011 | Zur et al. |

FOREIGN PATENT DOCUMENTS

| CN | 1875059 | 12/2006 |
| EP | 3 202 832 | 8/2017 |
| EP | 3 521 352 | 8/2019 |
| JP | 63-501220 | 5/1988 |
| JP | 2-255738 | 10/1990 |
| JP | 4-103642 | 4/1992 |
| JP | 8-151467 | 6/1996 |
| JP | 2003-82144 | 3/2003 |
| JP | 2012072258 | * 4/2012 |
| JP | 2012-211215 | 11/2012 |
| WO | 2007/029924 | 3/2007 |
| WO | 2016/052555 | 4/2016 |

OTHER PUBLICATIONS

Extended European Search Report dated Dec. 14, 2020, in corresponding European Patent Application No. 18774753.0.
International Search Report dated Jun. 19, 2018 in International Application No. PCT/JP2018/013964.

* cited by examiner

*Primary Examiner* — Irina S Zemel
(74) *Attorney, Agent, or Firm* — Wenderoth, Lind & Ponack, L.L.P.

(57) ABSTRACT

Provided is a crosslinked polyolefin foam is made by crosslinking and foaming the composition, wherein a product of 25% compressive strength (kPa) and tensile strength (MPa) of the crosslinked polyolefin foam at normal temperature is 35 to 65.

8 Claims, No Drawings

CROSSLINKED POLYOLEFIN FOAM AND MOLDED BODY USING SAME

TECHNICAL FIELD

The present invention relates to a crosslinked polyolefin foam for use as materials for vehicle interior and the like, and a molded product made from the same.

BACKGROUND ART

Crosslinked polyolefin foams are excellent in mechanical strength, flexibility, weight saving, insulation, etc., and widely used as insulators, cushions, etc., in various fields. For example, in an automobile field, the foams are used as materials for vehicle interior including a ceiling, a door, and an instrument panel. As the resin in crosslinked polyolefin foams, polyolefin resins such as polypropylene resins are used. It is also known that an elastomer is mixed in the polyolefin resin as disclosed in Patent Literature 1. In general, crosslinked polyolefin foams mixed with an elastomer have a reduced compressive strength and enhanced flexibility.

CITATION LIST

Patent Literature

PTL1: International Publication No. WO 2007/029924

SUMMARY OF INVENTION

Technical Problem

Crosslinked polyolefin foams are required to have further improved flexibility for improvement in touch feeling, for example, for use as vehicle interior in some cases. However, even in the case where the compressive strength is reduced through mixing with an elastomer as in PTL1, the soft tactile sensation may not be created so much, and thus improvement in touch feeling may not be achieved. Further, in the case where the compressive strength is reduced through increase in the amount of an elastomer to achieve softer touch, the molding properties in a secondary processing of the foam may be worsened or the mechanical strength may be reduced.

It is an object of the present invention, in view of these circumstances, to provide a crosslinked polyolefin foam having improved molding properties and exhibiting an excellent touch feeling.

Solution to Problem

Through extensive studies, the present inventors have focused on not only the compressive strength but also the tensile strength of a foam made by crosslinking and foaming the composition and found that through control of the product thereof in a predetermined range, a crosslinked polyolefin foam with excellent molding properties, which creates an excellent touch feeling, can be obtained. The present invention has been thus accomplished.

The present invention provides the following [1] to [11].

[1] A crosslinked polyolefin foam made by crosslinking and foaming the composition, wherein a product of 25% compressive strength (kPa) and tensile strength (MPa) of the crosslinked polyolefin foam at normal temperature is 35 to 65.

[2] The crosslinked polyolefin foam according to item [1], wherein the polyolefin resin composition contains a polypropylene resin and an olefin rubber.

[3] The crosslinked polyolefin foam according to item [1] or [2], wherein the 25% compressive strength is 40 to 70 kPa.

[4] The crosslinked polyolefin foam according to any one of items [1] to [3], wherein the tensile strength (MPa) is 0.5 to 1.5 MPa.

[5] The crosslinked polyolefin foam according to any one of items [2] to [4], wherein the mass ratio between the polypropylene resin and the olefin rubber, polypropylene resin/olefin rubber, is 45/55 to 70/30.

[6] The crosslinked polyolefin foam according to any one of items [1] to [5], having a crosslinking degree of 30 to 65% as a whole.

[7] The crosslinked polyolefin foam according to any one of items [2] to [6], wherein the polypropylene resin is an ethylene-propylene random copolymer.

[8] The crosslinked polyolefin foam according to any one of items [2] to [7], wherein the olefin rubber is an ethylene-α-olefin copolymer rubber.

[9] A molded product obtained by molding the crosslinked polyolefin foam according to any one of items [1] to [8].

[10] The molded product according to item [9], having a skin material laminated on and integrated with the crosslinked polyolefin foam.

[11] The molded product according to item [9] or [10] for use as a material for vehicle interior.

Advantageous Effects of Invention

According to the present invention, a crosslinked polyolefin foam having improved molding properties and exhibiting excellent touch feeling can be provided.

DESCRIPTION OF EMBODIMENT

[Crosslinked Polyolefin Foam]

The crosslinked polyolefin foam in an embodiment of the present invention is made by crosslinking and foaming the composition, and a product of 25% compressive strength (kPa) and tensile strength (MPa) of the crosslinked polyolefin foam at normal temperature is 35 to 65.

<Product of 25% Compressive Strength and Tensile Strength at Normal Temperature>

As an index of flexibility of a foam, the numerical value of 25% compressive strength at normal temperature is used in many cases. In the real tactile sensation, however, the same numerical value has resulted in soft touch feeling (with soft tactile sensation) or hard touch feeling (without soft tactile sensation) as the case may be. In other words, using only the 25% compressive strength as index is not enough to achieve excellent touch feeling. The present inventors, therefore, have focused on not only the compressive strength (compressive stress) in the vertical direction but also the tensile strength against deformation, as the force applied to an object to be contacted. It has been found that due to a tensile stress applied to a compressed material, the hardness of an object having a high tensile strength increases to create a hard touch feeling. As a result, excellent touch feeling such as soft and comfortable feel cannot be obtained. It can be presumed that the human tactile sensation is under the influence of the synergistic effect of the two stresses. On the other hand, an excessively softened foam may be subjected to incidence of defects in subsequent molding (secondary molding). As a new index for balancing therebetween, it has been found that excellent molding properties and touch feeling are exhibited when the product of the compressive strength and the tensile strength is within the predetermined range.

The product of the 25% compressive strength (kPa) and the tensile strength (MPa) of the foam at normal temperature is preferably 35.5 to 64.5, more preferably 36 to 64.

The product of the 25% compressive strength and the tensile strength can be adjusted to a desired range, for example, by adjusting the 25% compressive strength to the range described below through adjustment of the apparent density and the thickness of a foam, by adjusting the tensile strength to the range described below through adjustment of the crosslinking degree, and also by balancing the two. Also, a polypropylene resin controlled at the following ratio allows the tensile strength to be easily adjusted, and an olefin rubber controlled at the following ratio allows the compressive strength to be easily adjusted.

The 25% compressive strength of the foam is preferably 40 to 70 kPa, more preferably 50 to 62 kPa.

The tensile strength at normal temperature is preferably 0.5 to 1.5 MPa, more preferably 0.7 to 1.1 MPa. Here, the term "normal temperature" refers to about 23° C.

In the case where a difference in the tensile strength is present between the MD direction and the TD direction of a foam, a larger value in the MD direction or the TD direction is employed as the tensile strength.

<Polyolefin Resin Composition>

It is preferable that the polyolefin resin composition to be crosslinked and foamed (hereinafter referred to simply as "resin composition" in some cases) contain a polypropylene resin and an olefin rubber.

(Polypropylene Resin)

The polypropylene resin is not particularly limited, and examples thereof include a propylene homopolymer (homopolypropylene) and a copolymer of propylene and another olefin. Although the copolymer of propylene and another olefin may be any one of a block copolymer, a random copolymer, and a random block copolymer, a random copolymer (random polypropylene) is preferred.

Examples of the other olefin to be copolymerized with propylene include an α-olefin such as ethylene, 1-butene, 1-pentene, 4-methyl-1-pentene, 1-hexene, 1-octene, 1-nonene and 1-decene. Among them, ethylene is preferred. In other words, an ethylene-propylene random copolymer is preferred as the polypropylene resin.

The copolymer of propylene and another olefin typically contains propylene in an amount of 90 to 99.5 weight % and an α-olefin other than propylene in an amount of 0.5 to 10 mass %, preferably contains propylene in an amount of 95 to 99 weight % and an α-olefin other than propylene in an amount of 1 to 5 mass %

The polypropylene resin has a melt flow rate (hereinafter also referred to as "MFR") of, preferably 0.4 to 4.0 g/10 min, more preferably 0.5 to 2.5 g/10 min. Use of the polypropylene resin having the MFR in the range tends to provide favorable molding properties in processing the resin composition to a foam and favorable molding properties in secondary processing of the foam. The polypropylene resins described above may be used singly or in combination of two or more. The MFR can be measured, for example, in accordance with JIS K7210, under conditions at a temperature of 230° C. with a load of 2.16 kgf for a polypropylene resin, at a temperature of 190° C. with a load of 2.16 kgf for polyethylene resin, and at a temperature of 230° C. with a load of 2.16 kgf for an olefin thermoplastic elastomer.

(Olefin Rubber)

As the olefin rubber, an olefin rubber having a Mooney viscosity ($ML_{1+4}$, 100° C.) of 15 to 85 is used. With a Mooney viscosity in the range, the flexibility and the molding properties can be improved in a good balance. In order to further improve the flexibility and the molding properties, the Mooney viscosity of the olefin rubber is preferably 25 to 75, more preferably 30 to 70. The Mooney viscosity ($ML_{1+4}$, 100° C.) can be measured in accordance with JIS K6300-1.

As the olefin rubber, an amorphous or low-crystalline rubber material substantially randomly copolymerized from a plurality of olefin monomers is preferred, and an ethylene-α-olefin copolymer rubber is more preferred from the viewpoint of improving the molding properties and the flexibility in a good balance.

Examples of the α-olefin for use in the ethylene-α-olefin copolymer rubber include one or a plurality of α-olefins having 3 to 15 carbon atoms, preferably 3 to 10 carbon atoms, such as propylene, 1-butene, 2-methylpropylene, 3-methyl-1-butene, 1-pentene, 1-hexene, 4-methyl-1-pentene, and 1-octene. In particular, propylene and 1-butene are preferred, and propylene is more preferred.

The ethylene-α-olefin copolymer rubber may contain another monomer unit in addition to an ethylene unit and an α-olefin unit.

Examples of the monomer to form the monomer unit include a conjugated diene having 4 to 8 carbon atoms such as 1,3-butadiene, 2-methyl-1,3-butadiene (isoprene), 1-3-pentadiene, and 2,3-dimethyl-1,3-butadiene; a nonconjugated diene having 5 to 15 carbon atoms such as dicyclopentadiene, 5-ethylidene-2-norbornene, 1,4-hexadiene, 1,5-dicyclooctadiene, 7-methyl-1,6-octadiene, and 5-vinyl-2-norbornene; a vinyl ester compound such as vinyl acetate; an unsaturated carboxylate such as methyl acrylate, ethyl acrylate, butyl acrylate, methyl methacrylate, and ethyl methacrylate; and an unsaturated carboxylic acid such as acrylic acid and methacrylic acid. The monomers may be used singly or may be used in combination of two or more. In particular, a nonconjugated diene having 5 to 15 carbon atoms is preferred, and 5-ethylidene-2-norbornene, 1,4-hexadiene, and dicyclopentadiene (DCPD) are more preferred from the viewpoint of easy availability.

In an ethylene-α-olefin copolymer rubber, the content of ethylene unit is typically 30 to 85 mass %, preferably 40 to 80 mass %, more preferably 45 to 75 mass %. The content of α-olefin unit such as propylene having 3 to 15, preferably 3 to 10, carbon atoms is typically 10 to 60 wt %, preferably 15 to 50 wt %. The content of other monomer units such as nonconjugated diene is typically 0 to 20 wt %, preferably 1 to 10 wt %.

An olefin thermoplastic elastomer (TPO) can also be used as the olefin rubber. An olefin thermoplastic elastomer (TPO) generally includes a hard segment of polyolefin such as polyethylene and polypropylene and a soft segment of rubber component such as EPM and EPDM. Any of a blended, a dynamic crosslinked, and a polymerized thermoplastic olefin elastomer may be used as the thermoplastic olefin elastomer (TPO).

Specific examples of the olefin rubber suitable for use include an ethylene-propylene copolymer rubber (EPR) and an ethylene-propylene-diene copolymer rubber (EPDM), and EPDM is preferred. Examples of the EPDM include an ethylene-propylene-5-ethylidene-2-norbornene copolymer rubber and an ethylene-propylene-dicyclopentadiene copolymer rubber, and in particular, an ethylene-propylene-dicyclopentadiene copolymer rubber is preferred.

The olefin thermoplastic elastomer has an MFR of, preferably 0.8 to 5.0 g/10 min, more preferably 1.5 to 4.0 g/10 min. Use of the olefin thermoplastic elastomer having the MFR in the range tends to provide favorable molding properties in processing the resin composition to a foam and favorable molding properties in secondary processing of the foam.

The ethylene-α-olefin copolymer rubber can be obtained by a publicly known polymerization method. Examples of the polymerization method include polymerization in an inert solvent such as hexane, heptane, toluene and xylene with use of a polymerization catalyst such as a Ziegler-Natta catalyst and a metallocene catalyst. The olefin rubbers may be used singly or may be used in combination of two or more.

(Other Component)

The polyolefin resin composition may be composed of a polypropylene resin and olefin rubber only, or may include a resin component other than these as long as it does not impair the effect of the present invention.

Examples of the resin components include a polyethylene resin, an ethylene-vinyl acetate copolymer, an ethylene-acrylic acid copolymer, an ethylene-alkyl(meth)acrylate copolymer, and modified copolymers produced by copolymerizing the above-mentioned copolymers with maleic anhydride.

<Compounding of Resin Composition>

The polypropylene resin is contained in an amount of preferably 40 mass % or more, more preferably 45 mass % or more, in the resin composition based on the total resin components. The resin is contained in an amount of preferably 90 mass % or less, more preferably 80 mass % or less, still more preferably 70 mass % or less, furthermore preferably 60 mass % or less. With a content controlled to the range, the tensile strength can be easily controlled to the desired range.

Since the crosslinked polyolefin foam is mainly composed of polypropylene resin as described above, the mechanical strength, heat resistance and the like of the foam can be improved. As described above, it is preferable that the polypropylene resin be a random polypropylene.

It is preferable that the polyolefin rubber content in the resin composition be 30 to 55 mass % based on the total resin components. With a content of 30 to 55 mass %, the foam tends to have excellent flexibility, resulting in soft tactile sensation, and further, the molding properties, the mechanical strength and the like of the foam tend to be improved. From the viewpoints of further improvement in the flexibility and the touch feeling of the foam, the content is more preferably 35 mass % or more, still more preferably 40 mass % or more. Further, from the viewpoint of improvement in the mechanical strength and the molding properties, the content is more preferably 53 mass % or less, still more preferably 52 mass % or less.

In the resin composition, the mass ratio between the polypropylene resin and the olefin rubber (polypropylene resin/olefin rubber) is preferably 45/55 to 70/30, more preferably 45/55 to 60/40. With a mass ratio of 45/55 to 70/30, excellent molding properties can be achieved.

The resin composition may further contain other resins such as polyethylene resin in addition to the polypropylene resin and the olefin rubber, as long as the object of the present invention is not impaired.

In the case of the resin composition comprising another resin such as a polyethylene resin, the content is preferably 30 parts by mass or less, more preferably 20 parts by mass or less, relative to 100 parts by mass of the polypropylene resin.

(Additive)

The resin composition for use in the present invention usually contains a foaming agent as an additive in addition to the resin components described above. Further, it is preferable that one or both of a crosslinking aid and an antioxidant be contained.

Foaming Agent

Foaming of the resin composition may be caused by a chemical foaming method or a physical foaming method. In a chemical foaming method, a compound added to the resin composition is thermally decomposed to generate a gas, which produces bubbles. In a physical foaming method, the resin composition is impregnated with a liquid having a low boiling point (foaming agent) and the foaming agent is then volatilized to produce cells. Although the foaming method is not particularly limited, a chemical forming method is preferred from the viewpoint of producing a foam having uniform closed cells.

A thermally decomposable foaming agent can be used as foaming agent. For example, an organic or inorganic chemical foaming agent can be used, having a decomposition temperature of about 160° C. to 270° C.

Examples of the organic foaming agent include: an azo compound such as azodicarbonamide, a metal azodicarboxylate (e.g. barium azodicarboxylate), and azobisisobutyronitrile; a nitroso compound such as N,N'-dinitrosopentamethylenetetramine; a hydrazine derivative such as hydrazodicarbonamide, 4,4'-oxybis(benzenesulfonyl hydrazide), and toluenesulfonyl hydrazide; and a semicarbazide compound such as toluenesulfonyl semicarbazide.

Examples of the inorganic foaming agent include an ammonium carbonate, sodium carbonate, ammonium hydrogen carbonate, sodium hydrogen carbonate, ammonium nitrite, sodium borohydride, and monosodium citrate anhydrate.

In particular, from the viewpoint of obtaining fine bubbles and the viewpoint of economic efficiency and safety, an azo compound and a nitroso compound are preferred; azodicarbonamide, azobisisobutyronitrile, and N,N'-dinitrosopentamethylenetetramine are more preferred; and azodicarbonamide is particularly preferred.

The foaming agents may be used singly or may be used in combination of two or more.

The amount of a thermally decomposable foaming agent added to the resin composition is preferably 1 to 30 parts by mass, more preferably 2 to 15 parts by mass, relative to 100 parts by mass of the resin components, from the viewpoint of proper foaming without burst of bubbles in a foam.

Crosslinking Aid

A multi-functional monomer may be used as crosslinking aid. Examples thereof include: a tri-functional (meth)acrylate compound such as trimethyrolpropane trimethacrylate and trimethyrolpropane triacrylate; a compound having three functional groups in a molecule such as trimellitic acid triallyl ester, 1,2,4-benzene tricarboxylic acid triallyl ester, and triallyl isocyanurate; a bi-functional (meth)acrylate compound such as 1,6-hexanediol dimethacrylate, 1,9-nonanediol dimethacrylate, 1,10-decanediol dimethacrylate, and neopentyl glycol dimethacrylate; a compound having two functional groups in a molecule such as divinylbenzene; diallylphthalate, diallylterephthalate, diallylisophthalate, ethylvinylbenzene, laurylmethacrylate, and sterylmethacrylate. Among them, tri-functional (meth)acrylate compound is more preferred.

The crosslinking aid may be used singly or may be used in combination of two or more.

The addition of a crosslinking aid to a resin composition allows the resin composition to be crosslinked with a smaller dose of ionizing radiation. As a result, the individual resin molecule is prevented from being cut or deteriorated by the exposure to ionizing radiation.

The content of the crosslinking aid is preferably 0.2 to 20 parts by mass, more preferably 0.5 to 15 parts by mass, relative to 100 parts by mass in the resin composition, from the viewpoint of easiness of adjustment or control of the crosslinking degree in foaming of the resin composition.

Antioxidant

Examples of the antioxidant include a phenol antioxidant, a sulfur antioxidant, a phosphorus antioxidant, an amine antioxidant. Among them a phenol antioxidant and a sulfur antioxidant are preferred, and use of a phenol antioxidant and a sulfur antioxidant in combination is more preferred.

Examples of the phenol antioxidant include 2,6-di-tert-butyl-p-cresol, n-octadecyl-3-(3,5-di-tert-butyl-4-hydorxyphenyl)propionate, 2-tert-butyl-6-(3-tert-butyl-2-hydroxy-5-methylbenzyl)-4-methylphenylacrylate, tetrakis [methylene-3-(3,5-di-tert-butyl-4-hydroxyphenyl) propionate]methane.

Examples of the sulfur antioxidant include dilauryl thiodipropionate, dimyristyl thiodipropionate, distearyl thiodipropionate, pentaerythrityl tetrakis(3-lauryl thiopropionate).

The antioxidants may be used singly or may be used in combination of two or more.

The content of the antioxidant is preferably 0.1 to 10 parts by mass, more preferably 0.2 to 5 parts by mass, relative to 100 parts by mass in the resin composition.

On an as needed basis, the resin composition may contain an additive other than the above-described ones such as an agent for adjusting decomposition temperature such as zinc oxide, zinc stearate and urea, a flame retardant, a metal toxicity inhibitor, an antistatic agent, a stabilizer, a filler, and a pigment.

<Physical Properties of Crosslinked Polyolefin Foam>

The crosslinked polyolefin foam of the present invention (hereinafter, also referred to simply as "foam") is made by crosslinking the resin composition and causing the composition to foam.

(Density)

The density (apparent density) of a foam is preferably 0.03 g/cm$^3$ or more, more preferably 0.032 g/cm$^3$ or more, still more preferably 0.035 g/cm$^3$ or more, from the viewpoint of improving the flexibility and the molding properties in a good balance. And the density is preferably 0.12 g/cm$^3$ or less, more preferably 0.11 g/cm$^3$ or less, still more preferably 0.10 g/cm$^3$ or less.

(Expansion Ratio)

The expansion ratio of a foam calculated as reciprocal of the density is preferably 8 cm$^3$/g or more, more preferably 9 cm$^3$/g or more, still more preferably 10 cm$^3$/g or more, furthermore preferably 15 cm$^3$/g or more, from the viewpoint of improving the flexibility and the mechanical strength in a good balance. And the expansion ratio is preferably 33 cm$^3$/g or less, more preferably 31 cm$^3$/g or less, still more preferably 29 cm$^3$/g or less, furthermore preferably 25 cm$^3$/g or less.

(Crosslinking Degree)

From the viewpoint of improving the flexibility, the mechanical strength and the molding properties in a good balance, the crosslinking degree of a foam as a whole (mass %) is preferably 30 to 65%, more preferably 35 to 55%, still more preferably 40 to 55%, furthermore preferably 45 to 55%.

The method for measuring the crosslinking degree will be described in Examples later.

(Thickness)

The thickness of a foam is preferably 0.5 mm or more, more preferably 0.8 mm or more, still more preferably 1.2 mm or more, and preferably 8 mm or less, more preferably 6 mm or less, still more preferably 5 mm or less. When the foam has a thickness in the range, both the flexibility and the molding properties can be easily improved and tends to be easily molded as materials for vehicle interior.

<Manufacturing Method of Foam>

The foam is manufactured by, for example, melt-kneading the resin composition, molding to a desired shape, then irradiating the resin composition with ionizing radiation so as to crosslink the resin composition, and causing the composition to foam by heating.

Specifically, a manufacturing method having the following steps 1 to 3 is more preferred:

Step 1: A step of melt-kneading the components to constitute the resin composition, and then forming the resin composition into a predetermined shape such as a sheet form.

Step 2: Irradiating the resin composition obtained in the step 1 with ionizing radiation so as to crosslink the resin composition.

Step 3: Heating the resin composition crosslinked in the step 2 at the decomposition temperature of the thermally decomposable foaming agent or higher for foaming so as to obtain a foam.

In the step 1, each of the components to constitute the resin composition is supplied to a kneader so as to be melt-kneaded at a temperature lower than the decomposition temperature of the thermally decomposable foaming agent, and then molding the melt-kneaded resin composition to a desired shape such as a sheet form preferably by the kneader used in the melt-kneading.

Examples of the kneader for use include a general-purpose kneader such as an injection molding machine, an extruder such as a mono-axial extruder and a bi-axial extruder, a Banbury mixer, and rolls. Among them, an injection molding machine and an extruder are preferred. With use of an injection molding machine, the manufacturing can be efficiently performed.

The resin temperature inside an injection molding machine or an extruder is preferably 120 to 220° C., more preferably 140 to 200° C., still more preferably 150 to 195° C.

In the step 2, the resin composition molded to a desired shape is irradiated with ionizing radiation.

Examples of the ionizing radiation include electron beam, a ray, (3 ray, and y ray, and X-ray. Among them, electron beam is preferred from the view point of productivity and achieving uniform irradiation.

In the case of a molded resin composition in a sheet form, a single side or both sides of the sheet may be irradiated with ionizing radiation.

The accelerating voltage of the ionizing radiation depends on the thickness of a foam resin composition to be irradiated. In the case of a thickness of 1.5 to 8 mm, the accelerating voltage is preferably 400 to 1200 kV, more preferably 500 to 1100 kV, still more preferably 600 to 1000 kV.

The normal dose of irradiation of the ionizing radiation is preferably 0.1 to 10 Mrad, more preferably 0.2 to 5 Mrad, still more preferably 0.3 to 3 Mrad, which may be determined so as to provide a desired crosslinking degree without occurrence of a roughened surface, cracks, or the like, considering the thickness of the foam resin composition to be irradiated.

After the resin composition is crosslinked by irradiation of the ionizing radiation as described above, the resin composition is heated at the decomposition temperature of the foaming agent or higher for foaming of the resin composition in the step 3, so that a foam can be obtained through foaming and molding at the same time.

The temperature for foaming of the resin composition by heating is typically 140 to 300° C., preferably 150 to 280° C., more preferably 160 to 260° C., depending on the decomposition temperature of the thermally decomposable foaming agent for use as foaming agent. The foam sheet may be stretched in one or both of the MD direction and the CD direction during or after foaming.

The foam of the present invention preferably has a closed cell structure, or may have a closed cell structure including open cells.

[Molded Product]

The molded product in an embodiment of the present invention is obtained by molding the crosslinked polyolefin foam of the present invention by a known method. In manufacturing the molded product, another material such as a substrate or a skin material may be laminated on the foam and bonded together. In other words, the structure of the molded product may have a skin material laminated on and integrated with the crosslinked polyolefin foam.

As the substrate to make the framework of a molded product, a thermoplastic resin is typically used. Examples of the thermoplastic resin for use as substrate include the polyolefin resin, a copolymer of ethylene and an α-olefin, vinyl acetate, or an acrylate, an ABS resin, and a polystyrene resin.

Examples of the skin material include: a polyvinyl chloride sheet; a mixed resin sheet of polyvinyl chloride and ABS resin; a thermoplastic elastomer sheet; a textile, a knitted product, and a nonwoven fabric made from natural fiber or man-made fiber; and leather such as artificial leather and synthetic leather. A composite molded product having a lenticel or grain pattern on the surface may be manufactured with use of a silicone stamper having a concave-convex pattern transferred from real leather, a stone or a wood.

Examples of the method for laminating a skin material on the surface include an extrusion lamination method, an adhesion lamination method including successive steps of adhesive application and lamination, a thermal lamination method (heat seal method), a hot melt method, and a high-frequency welding method, any of which can be employed as long as the skin material can be bonded to the surface.

Examples of the molding method of the molded product of the present invention include stamping, vacuum molding, compression molding and injection molding. Among them, stamping and vacuum molding are preferred. As the vacuum molding, any of the vacuum molding over a male mold and the vacuum molding in a female mold may be used, and the vacuum molding over a male mold is more preferred.

The molded product made of the laminated foam sheet of the present invention can be used as an insulator, a cushion, and the like, and can be preferably used in an automobile field as materials for vehicle interior such as a ceiling material, a door, and an instrument panel.

EXAMPLES

The present invention will be further described in detail with reference to Examples below. The present invention is not limited to Examples, though.

The method for measuring each of the physical properties and the method for evaluating a foam sheet are as follows.

(1) Density and expansion ratio of foam

The density (apparent density) of a foam was measured in accordance with JIS K7222.

The expansion ratio of the foam was calculated as the reciprocal of the obtained density.

(2) Crosslinking degree

A test piece of about 100 mg was sampled from a foam sheet, and the weight A (mg) of the test piece was accurately measured.

Subsequently the test piece was immersed in 30 cm$^3$ of xylene at 120° C. and left standing for 24 hours. The resulting xylene was then filtered with a 200-mesh metal screen, and insoluble components on the metal mesh were collected and vacuum-dried. The weight B (mg) of the insoluble components was accurately measured. The crosslinking degree (mass %) was calculated from the resulting value based on the following formula.

Crosslinking degree (mass %)=(B/A)×100

(3) Thickness of foam

A dial gauge was used for the measurement.

(4) 25% Compressive strength

The measurement was performed in accordance with JIS K6767.

(5) Tensile strength

The tensile strength of a foam sheet was measured at normal temperature (23° C.) with a tensile tester in accordance with JIS K6767 (method A).

(6) Sensory evaluation on tactile sensation (sensory evaluation on soft feeling)

The foam obtained in Examples or Comparative Examples each was compressed with a finger to evaluate the tactile sensation on a scale of 1 to 5. Note that "1" indicates the hardest feel, and that a larger number indicates the softer feel.

(7) Evaluation on molding properties

The foam obtained in each of Examples and Comparative Examples was formed into a molded product in a bottomed cylindrical cup form having a diameter of 80 mm and a height of 56 mm under conditions at a surface temperature of 120° C., using a vacuum forming machine. The molded product was visually observed to evaluate the molding properties on the following scale.

1: overall rupture, 2: partial rupture, 3: presence of many see-through spots, 4: presence of partially see-through spots, 5: overall uniformity Examples 1 to 4, and Comparative Examples 1 to 3

The resin components and the additives each shown in Table 1 in an amount shown in Table 1 were supplied to a mono-axial extruder, melt-kneaded at a resin temperature of 180° C., and extruded to obtain a resin composition in a sheet form having a predetermined thickness. Both sides of the resin composition in a sheet form were irradiated with electron beams at an acceleration voltage of 800 kV, with a dose of 1 Mrad, so that the resin composition was crosslinked. Subsequently, the crosslinked resin composition was heated in a hot air oven at 220 to 280° C. for 5 minutes so as to cause foaming. A crosslinked polyolefin foam having a predetermined thickness and a density was thus obtained. The physical properties and evaluation results are shown in Table 1.

TABLE 1

|  |  | Example | | | | Comparative Example | | |
| --- | --- | --- | --- | --- | --- | --- | --- | --- |
|  |  | 1 | 2 | 3 | 4 | 1 | 2 | 3 |
| Compounding of resin composition (part by mass) | PP | 56 | 56 | 56 | 48 | 75 | 53 | 40 |
|  | EPDM | 44 | 44 | 44 | 52 | 25 | 26 | 60 |
|  | LL | 0 | 0 | 0 | 0 | 0 | 21 | 0 |
|  | Foaming agent | 8.5 | 8.5 | 8.5 | 8.5 | 8.8 | 8.3 | 8.3 |
|  | Crosslinking aid | 3 | 3 | 3 | 3 | 3 | 3 | 3 |
|  | Antioxidant 1 | 0.3 | 0.3 | 0.3 | 0.3 | 0.3 | 0.3 | 0.3 |
|  | Antioxidant 2 | 0.3 | 0.3 | 0.3 | 0.3 | 0.3 | 0.3 | 0.3 |
| Physical properties of foam | Crosslinking degree (mass %) | 52 | 52 | 52 | 52 | 47 | 55 | 51 |
|  | Expansion ratio ($cm^3/g$) | 18 | 20 | 22 | 22 | 20 | 20 | 20 |
|  | Density ($g/cm^3$) | 0.056 | 0.050 | 0.045 | 0.045 | 0.050 | 0.050 | 0.050 |
|  | Thickness (mm) | 4 | 4 | 4 | 4 | 4 | 4 | 4 |
|  | 25% compressive strength (kPa): A | 60.5 | 60.0 | 53.0 | 52.0 | 90.5 | 59.5 | 49.0 |
|  | Tensile strength at normal temperature (MPa): B | 1.05 | 0.90 | 0.80 | 0.70 | 0.95 | 1.15 | 0.65 |
|  | Product: A × B | 64 | 54 | 42 | 36 | 86 | 68 | 3.2 |
| Evaluation result | Molding property | 4 | 4 | 4 | 3 | 5 | 4 | 1 |
|  | Sensory evaluation on soft feeling | 3 | 3 | 3 | 4 | 1 | 2 | 5 |

The details of the resin components and the additives shown in Table 1 are as follows.

PP (random PP): ethylene-propylene random copolymer, product name: NOVATEC EG7F, manufactured by Japan Polypropylene Corporation, MFR=1.3 g/10 min, ethylene content: 3 mass %

EPDM: ethylene-propylene-diene copolymer, product name: ESPRENE 301, manufactured by Sumitomo Chemical Co., Ltd., Mooney viscosity ($ML_{1+4}$, 100° C.)=55, ethylene content: 62 mass %, DCPD content: 3 mass %

LL (LLDPE): Straight-chain low-density polyethylene, manufactured by The Dow Chemical Company, product name: 2036P, MFR: 2.5 g/10 min Foaming agent: azodicarbonamide Crosslinking aid: trimethyrol propane trimethacrylate Antioxidant 1: 2,6-di-tert-butyl-p-cresol Antioxidant 2: dilauryl thiodipropionate As described above, the crosslinked polyolefin foam obtained in Examples 1 to 4 each had excellent molding properties and touch feeling (soft feeling).

On the other hand, the crosslinked polyolefin foam obtained in Comparative Examples 1 to 3 each had worsened flexibility or poor molding properties.

The invention claimed is:

1. A crosslinked polyolefin foam comprising,
a polyolefin resin composition that has been crosslinked and foamed such that the crosslinked polyolefin foam is obtained,
wherein the crosslinked polyolefin foam has a 25% compressive strength (kPa) and a tensile strength (MPa) such that the product of the 25% compressive strength (kPa) and the tensile strength (MPa) at normal temperature is 35 to 65,
wherein the crosslinked polyolefin foam has a crosslinking degree of 45% to 65% as a whole, and
wherein the polyolefin resin composition has a resin component that consists of
a polypropylene resin and an olefin rubber,
wherein the polyolefin resin composition has an olefin rubber content of 44 to 55 mass % based on the total resin components,
wherein the crosslinked polyolefin foam has an expansion ratio of 15 $cm^3/g$ or more, and
wherein the polyolefin resin composition to be crosslinked and foamed comprises a foaming agent.

2. The crosslinked polyolefin foam according to claim 1, wherein the 25% compressive strength is 40 to 70 kPa.

3. The crosslinked polyolefin foam according to claim 1, wherein the tensile strength (MPa) is 0.5 to 1.5 MPa.

4. The crosslinked polyolefin foam according to claim 1, wherein the polypropylene resin is an ethylene-propylene random copolymer.

5. The crosslinked polyolefin foam according to claim 1, wherein the olefin rubber is an ethylene-α-olefin copolymer rubber.

6. A molded product obtained by molding the crosslinked polyolefin foam according to claim 1.

7. The molded product according to claim 6, having a skin material laminated on and integrated with the crosslinked polyolefin foam.

8. The molded product according to claim 6, for use as a material for vehicle interior.

* * * * *